W. GERWIEN.
RESILIENT TIRE.
APPLICATION FILED DEC. 28, 1918.

1,315,626.　　　　　　　　　　　　　　　Patented Sept. 9, 1919.

Inventor
William Gerwien

By
Obed E. Billman, Attorney

UNITED STATES PATENT OFFICE.

WILLIAM GERWIEN, OF SAN FRANCISCO, CALIFORNIA.

RESILIENT TIRE.

1,315,626. Specification of Letters Patent. Patented Sept. 9, 1919.

Application filed December 28, 1918. Serial No. 268,690.

*To all whom it may concern:*

Be it known that I, WILLIAM GERWIEN, a citizen of the United States, residing at San Francisco, in the county of San Francisco and State of California, have invented certain new and useful Improvements in Resilient Tires, of which the following is a specification.

My invention relates to improvements in resilient tires, the invention being particularly designed and adapted for use in connection with heavy motor vehicles such as motor trucks, heavy service cars, and the like.

The primary object of the invention is to provide a generally improved resilient tire which will be exceedingly simple in construction, cheap of manufacture, and efficient in use.

A further object is the provision of an improved armored tire particularly adapted to eliminate the liability to punctures, rim-cutting, blow outs, and the like, as is the case with the ordinary pneumatic tire.

A still further object is the provision of an improved tire embodying channel shaped overlapping inner and outer tire sections conjointly forming an intermediate air chamber, together with a flexible tire lining section carried within one of said tire sections and overlapping the other and seated in said air chamber, said flexible tire lining being removably secured within said inner and outer tire sections in an improved manner and preventing any leakage of air between the overlapping portions of the tire sections.

A still further object is the provision of improved resilient tire filler members interposed between said flexible tire lining section and said inner and outer tire sections and adapted to coöperate with the latter and said flexible tire lining in the relative radial and circumferential movements of said outer or movable tire section thereby forming a combined pneumatic and resilient tire.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
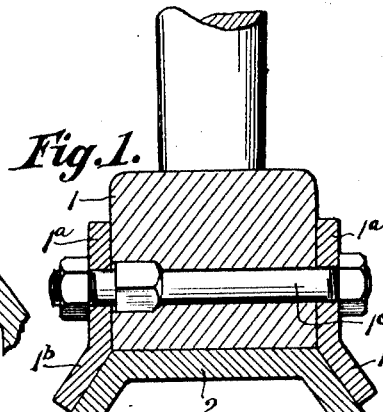

Referring to the drawings, forming a part of this specification, Figure 1, is a cross sectional view of the improved tire, as applied to an ordinary wheel felly, the movable parts being shown partly under compression or load.

Figure 2:
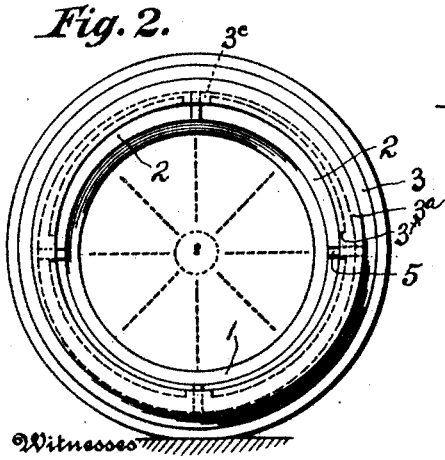

Fig. 2, a side elevation of a wheel felly and tire, the movable tire sections being under load and moved eccentrically to the wheel felly and fixed tire section, and illustrating in particular the relative position and action of the stop members between the fixed and movable tire sections for limiting the relative, radial and circumferential movements of the movable tire section.

Figure 3:
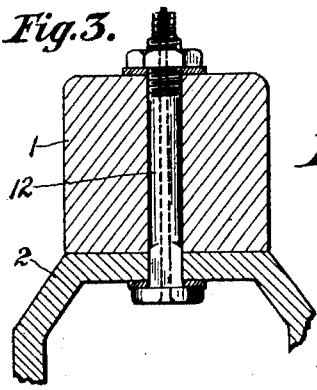

Fig. 3, a cross sectional view of a wheel felly, illustrating the valve stem, the felly clamp rings for removably mounting the tire being removed.

Figure 4:
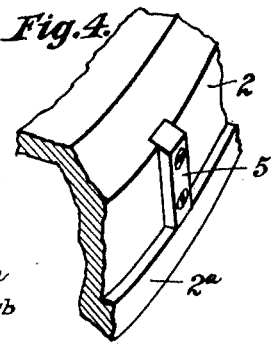

Fig. 4, a fragmentary perspective view of the outer stop portions of the fixed tire section.

Figure 5:
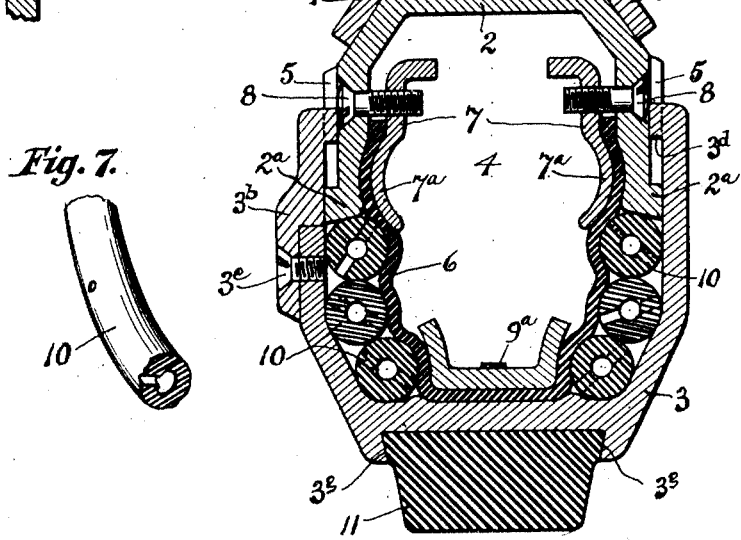
Figure 5:
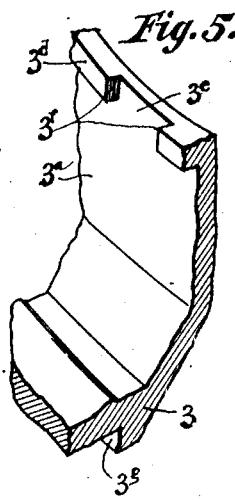

Fig. 5, a similar view of the corresponding inner stop portion of the movable tire section, for limiting the relative radial and circumferential movements of the latter in service.

Figure 6:
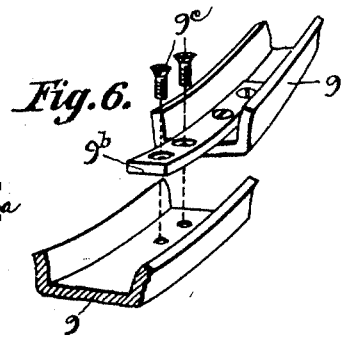

Fig. 6, a perspective disassembled view of the connections at the ends of the securing member or split channel ring for securing the flexible tire lining section within the outer or movable tire section.

Fig. 7, a fragmentary perspective view of one of the resilient tire filler members inserted between the tire lining section and the sides of the movable tire section.

Similar numerals of reference designate like parts throughout all the figures of the drawings.

The improved resilient tire is adapted to be mounted upon a wheel and felly of any suitable and convenient construction.

As a means of removably mounting the improved tire upon an ordinary wheel felly 1, the latter may be provided at its sides with clamp rings or members 1ª, terminating in outwardly flaring flanges 1ᵇ, to receive the inner or fixed tire section hereinafter referred to, said clamping members 1ª, being removably secured to the wheel felly by means of cross bolts 1ᶜ.

The improved tire comprises channel shaped overlapping inner and outer tire sections 2 and 3, respectively, forming an inner intervening air chamber 4. The inner and outer tire sections 2 and 3, are preferably formed of suitable light weight metal, such as aluminum, or the like, and as a means of properly guiding and connecting the overlapping portions of the tire sections 2 and 3, the inner or fixed tire section 2, is provided at its sides with friction guide rims or flanges 2ª, to slidably move within the corresponding sides 3ª, of the outer or movable tire section, and as a means of conveniently assembling the tire sections 2 and 3, the outer tire section 3, is preferably provided with a removable side member 3ᵇ, secured by means of screws 3ᶜ.

As a means of limiting the radial and circumferential movements of the outer or movable tire section 3, relative to the inner tire section 2, in actual service, the sides of the relatively fixed tire section 2, are provided with stop blocks or members 5, and the sides 3ª and the removable side member 3ᵇ, terminate in inwardly extending flanges 3ᵈ, provided with recesses 3ᵉ, adapted to receive and contain the stop blocks 5, and forming stop shoulders 3ᶠ, spaced from the sides of the stop blocks 5, so that the latter may be moved relatively therein during the radial and circumferential movements of the outer tire section and coöperating therewith and limiting the movements thereof, as most clearly shown in Fig. 2, of the drawings.

As a means of forming an air chamber which will not permit the escape of air at any point, and particularly as a means of sealing the overlapping portions of the inner and other tire sections 2 and 3, the inner or fixed tire section 2, is provided with a flexible tire lining section 6, said lining section being preferably formed of rubber and being of channel or U-shape as shown.

As a means of removably securing and clamping the edges of the flexible tire lining 6, within the sides of the inner or fixed tire section 2, and particularly as a means of securing such lining section in such a manner as to prevent any tearing or mutilation thereof during the varying exigencies of actual service, split clamping ring members 7, are removably mounted on the inner sides of the inner or fixed tire section, said clamping ring members being preferably secured and drawn in place by means of screws 8. The ring members 7, are provided with rounded clamping portions 7ª, which converge inwardly which not only engage the sides of the tire lining member 6, but being converged inwardly to coöperate with the resilient tire filler members hereinafter described.

As a means of removably securing the outer or intermediate portions of the tire lining section 6, to the outer or movable tire section 3, the latter is provided with a split clamping ring or member 9, suitably secured by means of suitable screws 9ª, said clamping ring 9, being preferably channel shaped, as shown.

As a means of giving a coöperating cushioning effect to the movements of the outer or movable tire section 3, and also forming a convenient support for the side walls of the tire lining section 6, a plurality of resilient tire filler members 10, said filler members being preferably formed of soft rubber and suitably perforated, as shown, and interposed between the sides of the tire lining section and sides of the movable outer tire section 3, and also arranged between the tread portion of the latter and the edges 2ª, of the fixed tire section 2.

As the outer or movable tire section 3, is moved toward the fixed or inner tire section 2, under load, it is obvious that the tire filler members 10, will be compressed between the edges of the guide rims 2ª, of the tire section 2, and the guides and tread portions of the outer tire section 3, and likewise the flexible tire lining section will be crinkled and compressed at various points, as the outer tire section moves eccentrically to the inner or fixed tire section as indicated in Fig. 2, of the drawings.

The adjacent ends of the split clamping ring 9, may be secured by means of a coupling plate 9ᵇ, and attaching screws 9ᶜ, as indicated most clearly in Fig. 6, of the drawings.

The outer or tread portion of the outer or movable tire section 3, is provided with a recess 3ᵍ, having its sides undercut and adapted to receive a suitable resilient tread member 11.

The chamber 4, of the inner and outer tread members may be filled with air, under compression, through the medium of a valve stem 12, extending through the base portion of the fixed tire section 2, and through the wheel felly 1, as indicated in Fig. 3, of the drawings.

In assembling the relatively fixed and movable tire sections 2 and 3, respectively, the main tire section 3 having removed therefrom the side member 3ᵇ, and provided with the lining section 6 and filler members 10, is passed over one side of the relatively fixed tire section 2, the clamping rings 7ª having been previously loosened for assembling, and the edges of the flexible tire lining section 6 are then inserted under the clamping members 7ª, after which the same are tightened through the medium of the screws 8, and then the removable side member 3ᵇ, is attached to the outer sides of the fixed and movable tire sections 2 and 3 by means of the screws 3ᶜ, the shorter side of the main tire section 3, when the side member 3ᵇ is removed, being of such dimensions as to readily clear the sides of the fixed tire section 2, in the act of assembling.

From the foregoing description, taken in connection with the accompanying drawings, the operation and advantages of my invention will be readily understood.

Having thus described some of the embodiments of my invention, what I claim and desire to secure by Letters Patent, is:—

1. A resilient tire, comprising channel shaped overlapping inner and outer tire sections forming an air chamber, a flexible tire lining section carried within one of said tire sections and overlapping the other and sealing said air chamber, resilient tire filler members interposed between said flexible tire lining section and said outer tire section, and means for removably securing said flexible tire lining section to said inner and outer tire sections.

2. A resilient tire, comprising channel shaped overlapping inner and outer metallic tire sections forming an air chamber, a flexible U-shaped tire lining section carried by said inner tire section and projecting into the other and sealing said air chamber, resilient tire filler members interposed between said flexible tire lining section and said outer tire section, and split rings for removably securing said flexible tire lining section to said inner and outer tire sections.

3. A resilient tire, comprising relatively fixed and movable channel shaped metallic tire sections conjointly forming an air chamber, a substantially U-shaped flexible tire lining member having its sides arranged within said fixed tire section and having its intermediate portion projecting into said movable tire section and spaced from the side walls of the latter, perforated resilient tire filler members filling the spaces between said side walls and said tire lining member, and means for removably securing the intermediate portion of said tire lining member to said movable tire section.

4. A resilient tire, comprising channel shaped inner and outer metallic tire sections conjointly forming an air chamber, said inner tire section being provided with friction guide rims arranged with the side walls of said outer tire section, a substantially U-shaped flexible tire lining section carried by said inner tire section and extending into said outer tire section, flexible filler members interposed between the latter and said lining section, and split rings arranged within the walls of said inner tire section and provided with rounded clamping portions clamping the edges of said U-shaped flexible tire lining section above said flexible filler members.

In testimony whereof I have affixed my signature.

WILLIAM GERWIEN.

Copies of this patent may be obtained for five cents each, by addressing the "Commissioner of Patents, Washington, D. C."